Patented Mar. 16, 1954

2,672,466

UNITED STATES PATENT OFFICE 2,672,466

6β,11α-DIHYDROXYPROGESTERONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application March 22, 1952, Serial No. 278,121

7 Claims. (Cl. 260—397.45)

This invention relates to 6,11α-dihydroxyprogesterone and one to eight carbon atom carboxylic acid esters of 6,11α-dihydroxyprogesterone represented as follows:

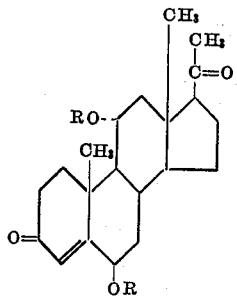

wherein R is hydrogen or acyl.

An object of this invention is to obtain 6,11α-dihydroxyprogesterone and esters thereof. These compounds have pharmacological activity and are additionally useful in the synthesis of other 11-oxygenated steroids such as cortisone.

The 6,11α-dihydroxyprogesterone may be prepared from progesterone as described in our applications of which this is a continuation-in-part, Serial No. 180,496, filed August 19, 1950, now abandoned, and Serial No. 272,944, filed February 23, 1952, now Patent 2,602,769, issued July 8, 1952.

PREPARATION.—6,11α-DIHYDROXYPROGESTERONE

A medium was prepared from five milliliters of corn steep liquor, twenty grams of Edamine commercial lactalbumin digest and fifty milligrams of Cerelose commercial dextrose per liter of tap water and adjusted to a pH of between about 5.5 and 5.9. To four liters of this medium containing a 32 to 48 hour growth, at room temperature with aeration, of *Rhizopus arrhizus*, ATCC 11145, was added one gram of progesterone in fifty milliliters of acetone. The culture was then incubated at room temperature for 48 hours. At the end of this time, the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of two percent aqueous sodium bicarbonate solution and three 500-milliliter portions of distilled water. The methylene chloride extract was evaporated to dryness in vacuum and the solid residue taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly to room temperature. Seventy-five milligrams of crystals, melting at 246 to 249 degrees centigrade, separated from the mother liquor. These crystals were dissolved in five milliliters of methanol and filtered into a centrifuge tube, the solution yielding, upon cooling, 23 milligrams of 6β,11α-dihydroxyprogesterone crystals melting at 245 to 248 degrees centigrade, $[\alpha]_D^{24}$ of plus 144 degrees (1.002 in pyridine), $k_{238}$ of 36.47.

The following examples are illustrative of the processes and products of the present invention and are not to be construed as limiting.

*Example 1.—6β,11α-diacetoxyprogesterone*

Nine milligrams of 6β,11α-dihydroxyprogesterone mixed with 0.3 milliliter of pyridine and 0.3 milliliter of acetic anhydride was maintained at room temperature for sixteen hours, then diluted with 12.5 milliliters of water and maintained at room temperature for an additional hour. Refrigeration of the mixture produced 6.7 milligrams of crystalline 6β,11α-diacetoxyprogesterone, melting point 145 to 148 and 154 to 155 degrees centigrade. Recrystallization from methanol gave melting points of 145 to 148 and 153 to 154 degrees centigrade, $[\alpha]_D^{24}$ of plus 71 degrees (0.417 in absolute ethanol). Infrared spectroscopy confirmed the structure.

*Analysis.*—Calculated for $C_{25}H_{34}O_6$: C, 69.74; H, 7.96. Found: C, 69.8; H, 7.72.

*Example 2.—6β,11α-diformyloxyprogesterone*

A mixture of 0.5 gram of 6β,11α-dihydroxyprogesterone in twenty milliliters of 87 percent formic acid was heated for two hours at 75 degrees centigrade. Upon adding water to cause precipitation, there resulted crystals of 6β,11α-diformyloxyprogesterone which were separated by filtration.

*Example 3.—6β,11α-dipropionyloxyprogesterone*

Following the procedure of Example 1, using the equivalent proportion of propionic anhydride in place of acetic anhydride, produced 6β,11α-dipropionyloxyprogesterone.

*Example 4.—6β,11α-dibenzoxyprogesterone*

Six milliliters of hot benzene was used to dissolve 0.2 gram of 6β,11α-dihydroxyprogesterone. The solution was cooled to room temperature. Then 0.4 milliliter of freshly dried and redistilled pyridine and 0.4 milliliter of freshly-distilled benzoyl chloride were added and maintained at room temperature for twenty hours. The reaction mixture was diluted with fifty milliliters of ether, washed successively with water, ten percent sodium hydroxide solution, and water, dried over anhydrous sodium sulfate, filtered and evaporated free of solvent. The residue was mixed with 25 milliliters of water and maintained under reflux for fifteen minutes, cooled, extracted with ether, washed with water, ten percent sodium hydroxide solution, and again with water, dried over anhydrous sodium sulfate, filtered and evaporated to a volume of ten milliliters. After cooling, the resulting crystals were removed by filtration and washed with benzene to yield crystalline 6β,11α-dibenzoxyprogesterone.

The corresponding 6β,11α-diacyloxyprogesterones can be made from 6β,11α-dihydroxyprogesterone according to acylation procedures, specifically as illustrated by each of the examples above, or by reaction with ketene, ketenes or an appropriate acid, acid anhydride or acyl halide in an organic solvent such as pyridine or the like. Representative esters of 6β,11α - dihydroxyprogesterone thus-prepared include one to eight carbon atom carboxylic acid acyloxy esters of saturated or unsaturated, aliphatic or carbocyclic, cycloaliphatic, aryl, alkaryl, aralkyl, mono, di or poly-carboxylic acids, formyloxy, acetoxy, propionyloxy, butyryloxy, valeryloxy, hexanoyloxy, heptanoyloxy, octanoyloxy, benzoxy, phenylacetoxy, toluoyloxy, cyclopentylformyloxy, β-cyclopentylpropionoxy, acrylyloxy, cyclohexanoyloxy, and the half and di-esters of 6β,11α-dihydroxyprogesterone with malonic, maleic, succinic, glutaric, adipic acids, and the like. The acids may also contain non-interfering substitutents, such as mono or poly halo, chloro, bromo, hydroxy, methoxy, and the like.

The 6β,11α-diacyloxyprogesterones of the present invention demonstrate inhibitory properties in estrogenic, glucocorticoid, folliculoid, luteoid, testoid, hypertensive, salt retention as exhibited by desoxycorticosterone, spermatogenic, and progesterone activities. They may be hydrolyzed, dehydrated and reduced to produce pregnane-3,20-dione.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. 6β,11α-diacyloxyprogesterone wherein acyloxy is a hydrocarbon-carboxylic acid radical containing from one to eight carbon atoms, inclusively.
2. 6β,11α-diacetoxyprogesterone.
3. 6β,11α-diformyloxyprogesterone.
4. 6β,11α-dipropionyloxyprogesterone.
5. 6β,11α-dibenzoxyprogesterone.
6. A compound selected from the group consisting of 6β,11α-dihydroxyprogesterone and 6β,11α-diacyloxyprogesterone wherein acyloxy is a hydrocarbon-carboxylic acid radical containing from one to eight carbon atoms, inclusively.
7. 6β,11α-dihydroxyprogesterone.

HERBERT C. MURRAY.
DUREY H. PETERSON.

References Cited in the file of this patent

Reichstein: Helv Chim. Acta 23, 684–688 (1940).
Windaus: Zeit. Physiol Chem. 121, 62–79 (1922).
Long: Jour. Biol. Chem. 165, 197–209 (1946).